(12) United States Patent
Tokumoto (10) Patent No.: US 12,474,860 B2
(45) Date of Patent: Nov. 18, 2025

(54) INFORMATION PROCESSING APPARATUS, CONTROL METHOD OF INFORMATION PROCESSING APPARATUS, AND NON-TRANSITORY STORAGE MEDIUM

(71) Applicant: CANON KABUSHIKI KAISHA, Tokyo (JP)

(72) Inventor: Yoko Tokumoto, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 290 days.

(21) Appl. No.: 18/176,181

(22) Filed: Feb. 28, 2023

(65) Prior Publication Data
US 2023/0280934 A1    Sep. 7, 2023

(30) Foreign Application Priority Data
Mar. 4, 2022    (JP) ................................. 2022-033143

(51) Int. Cl.
*G06F 3/06*    (2006.01)
(52) U.S. Cl.
CPC .......... *G06F 3/0655* (2013.01); *G06F 3/0604* (2013.01); *G06F 3/0679* (2013.01)
(58) Field of Classification Search
CPC ..... G06F 3/0655; G06F 3/0604; G06F 3/0679
See application file for complete search history.

(56) References Cited

U.S. PATENT DOCUMENTS

| 2011/0145306 A1* | 6/2011 | Boyd ................... | G06F 12/0246 711/E12.001 |
| 2012/0054465 A1* | 3/2012 | Post .................... | G06F 12/0246 711/E12.078 |
| 2016/0103613 A1* | 4/2016 | Oshins .................. | G06F 3/064 711/170 |

FOREIGN PATENT DOCUMENTS

JP    2021099642 A    7/2021

* cited by examiner

*Primary Examiner* — Gary W. Cygiel
(74) *Attorney, Agent, or Firm* — Canon U.S.A., Inc. IP Division (57) ABSTRACT

An information processing apparatus including a semiconductor storage device according to one aspect of the present disclosure includes: a swap enabling unit configured to enable a swap area provided in the semiconductor storage device during startup of the information processing apparatus; a first trim process unit configured to perform a first trim process of notifying the semiconductor storage device of a storage area that no longer requires the swap area; a checking unit configured to check usage status of the swap area and save the usage status in a nonvolatile storage area during shutdown of the information processing apparatus; and a first control unit configured to control whether or not to perform the first trim process based on the usage status of the swap area saved in the nonvolatile storage area during startup of the information processing apparatus.

6 Claims, 7 Drawing Sheets

INFORMATION PROCESSING APPARATUS, CONTROL METHOD OF INFORMATION PROCESSING APPARATUS, AND NON-TRANSITORY STORAGE MEDIUM

BACKGROUND

Field

The present disclosure relates to trim execution control in an information processing apparatus such as a digital multifunction peripheral.

Description of the Related Art

In recent years, information processing apparatuses including a nonvolatile semiconductor storage device with a flash memory such as a solid state drive (SSD) or an embedded multimedia card (eMMC) have increased. While such semiconductor storage devices are superior to hard disc drives (HDD) in terms of access speed, quietness, and the like, the number of rewritable times is limited. Thus, in semiconductor storage devices, to extend the lifetime of a built-in flash memory, distributed writing called wear levelling is performed by a controller of the semiconductor storage device.

In wear levelling, a block is replaced to perform writing so that a block that has been less written is used as much as possible. Thus, when a wear levelling process is being performed in an information processing apparatus, block deletion, data copy, or the like may occur during block replacement, and the performance (writing performance) of the semiconductor storage device may be reduced.

In nonvolatile semiconductor storage devices, it is general to perform a process called trim (TRIM) as a method for compensating a reduction in performance. The trim is a command that notifies a storage device of a storage area that is no longer necessary for a file system of operating system (OS). Specifically, a command of trim is used to notify a controller for a semiconductor storage device of an area that is no longer used. The controller for the semiconductor storage device that has received this notification can recognize an unused area and collect only used areas (garbage collection) to perform wear levelling. Thus, the amount of data to be copied in wear levelling is reduced, the number of used blocks is also reduced, and the number of times of rewriting is also reduced as a whole. In such a way, by using a trim command to notify a semiconductor storage device of a storage area that is no longer necessary, this eliminates a need to perform wear levelling process on the unnecessary area, and it is possible to suppress a reduction in the performance of the semiconductor storage device.

As an execution method of a trim command, a mount option called "discard" is designated when a partition of a semiconductor storage device is mounted and used. Trim commands are then sequentially issued every time writing occurs to the semiconductor storage device in the mechanism of a file system of OS (sequential trim function). Note that, in the sequential trim function, an application is not required to issue a trim command at a particular timing, but the overall operation speed may be reduced. Further, some types of OS or file systems may incompatible with the sequential trim function.

As a method of executing a trim command other than the sequential trim function described above, there is a method in which an application executes an external command "fstrim" for performing trim issuance on a semiconductor storage device at a particular timing. Once the application designates an area of the semiconductor storage device and executes the fstrim command provided by OS, the OS searches for an unused area on a file system of the designated area and issues a trim command to the semiconductor storage device. In such a case, the application will execute the fstrim command during an idle period or a standby period, execute the fstrim command in response to an instruction from the user, or execute the fstrim command at a designated time. Japanese Patent Application Laid-Open No. 2021-99642 proposes a technology in which the application checks the usage status of an information processing apparatus, counts at least one type of data values, and facilitates execution of a trim process in response to the counted data satisfying a condition with respect to a threshold.

In the semiconductor storage device, there are areas other than an area that has a file system area and can explicitly issue a fstrim command from an application. For example, although a swap area has no file system and is unable to issue a fstrim command, it is required to perform a trim process on the swap area. For the swap area, a swap enabling command is provided by OS, and a trim process may be performed on the overall swap area by the function of the OS regardless of the usage status of the swap area when swap is enabled. In such a case, if a swap enabling process is performed every time the information processing apparatus is started, this has an adverse effect such as a longer startup time before the application completes the startup and the information processing apparatus is ready to be used, which may reduce user convenience.

SUMMARY

Various embodiments of the present disclosure provide a mechanism that, while suppressing deterioration in the performance of a semiconductor storage device, shortens the startup time in accordance with the usage status of a swap area and thereby improves user convenience.

Various embodiments of the present disclosure are directed to an information processing apparatus including a semiconductor storage device. The information processing apparatus includes a swap enabling unit configured to enable a swap area provided in the semiconductor storage device during startup of the information processing apparatus, a first trim process unit configured to perform a first trim process of notifying the semiconductor storage device of a storage area that no longer requires the swap area, a checking unit configured to check usage status of the swap area and save the usage status in a nonvolatile storage area during shutdown of the information processing apparatus, and a first control unit configured to control whether or not to perform the first trim process based on the usage status of the swap area saved in the nonvolatile storage area during startup of the information processing apparatus.

Further features of the present disclosure will become apparent from the following description of example embodiments with reference to the attached drawings.

DESCRIPTION OF THE EMBODIMENTS

Various embodiments of the present disclosure will be described below in detail with reference to the attached drawings. Note that the following example embodiments are not intended to limit the present claimed scope, and all the combinations of features described in the present embodiment are not necessarily required to be essential for the solution of the present disclosure. Note that description will be provided with an example of a multi-function peripheral (MFP) (digital MFP/image processing apparatus) as an information processing apparatus according to the embodiments. However, the applicable scope of the present disclosure is not limited to MFPs and can be applied to any information processing apparatus including a semiconductor storage device.

First Embodiment

Description of Device

Figure 1:
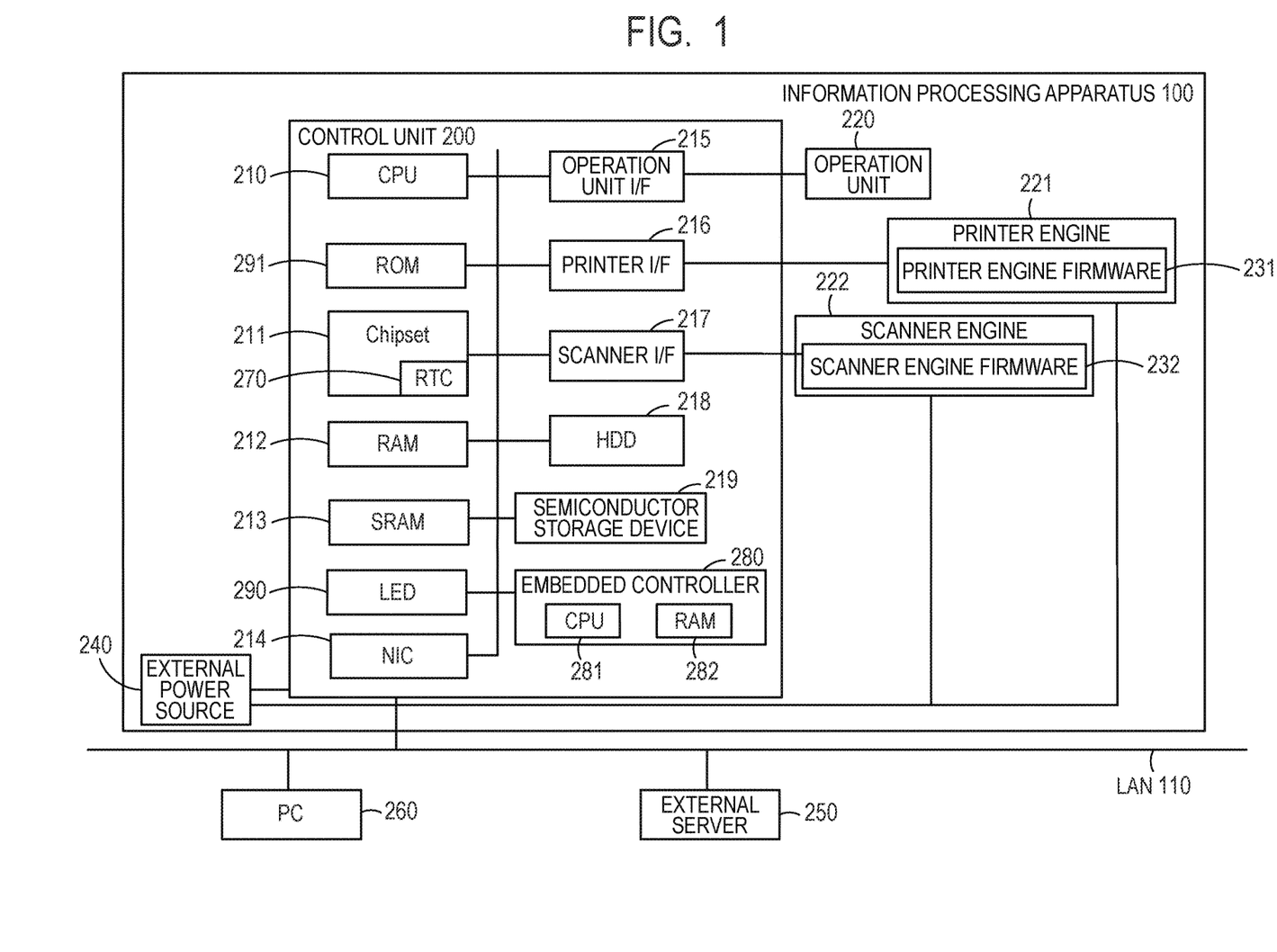
FIG. 1 is a diagram illustrating an example of a hardware configuration of an information processing apparatus illustrating the present embodiment.

FIG. 1 is a diagram illustrating an example of a hardware configuration of an information processing apparatus 100 illustrating one embodiment of the present disclosure.

A control unit 200 including a CPU 210 controls the overall operation of the information processing apparatus 100. The CPU 210 reads a control program stored in a semiconductor storage device 219 to perform various control processes such as reading control, printing control, firmware update control, or the like. In the present embodiment, the description will be provided with an eMMC as an example of the semiconductor storage device, and hereafter, "semiconductor storage device 219" is referred to as "eMMC 219". The eMMC 219 is an example of a semiconductor storage device using a flash memory (Flash ROM). Note that the semiconductor storage device 219 is not limited to an MMC and may be other semiconductor storage devices such as an SSD. The eMMC 219 is used as a work area, a user data area, or the like.

A ROM 291 is a read-only memory and stores Basic Input Output System (BIOS) of the information processing apparatus 100, a fixed parameter, or the like. A RAM 212 is used as a temporary storage area such as a main memory, a work area, or the like of the CPU 210. An SRAM 213 is a nonvolatile memory, stores setting values, image adjustment values, or the like required by the information processing apparatus 100, and holds data so as not to be deleted even when re-powered on.

An HDD 218 has a file storage area for firmware update and also stores image data, user data, or the like. The HDD 218 may not be mounted, and in such a case, the file storage area for firmware update, image data, user data, or the like are all stored in the eMMC 219.

An operation unit I/F 215 connects an operation unit 220 to the control unit 200. The operation unit 220 is provided with a liquid crystal display unit having a touch panel function, a keyboard, or the like.

A printer I/F 216 connects a printer engine 221 to the control unit 200. A ROM (not illustrated) included in the printer engine 221 stores printer engine firmware 231. Image data to be printed by the printer engine 221 is transferred from the control unit 200 to the printer engine 221 via the printer I/F 216 and printed on a recording medium by the printer engine 221.

A scanner I/F 217 connects a scanner engine 222 to the control unit 200. A ROM (not illustrated) included in the scanner engine 222 stores scanner engine firmware 232. The scanner engine 222 reads an image in a document to generate image data and inputs the image data to the control unit 200 via the scanner I/F 217.

A network I/F card (NIC) 214 connects the control unit 200 (the information processing apparatus 100) to a LAN 110. The NIC 214 transmits image data or information to an external device (for example, an external server 250 or a PC 260) on the LAN 110 and, in turn, receives update firmware or various information. The external server 250 may be present on the Internet. The operation of the information processing apparatus 100 may be performed from a web browser (not illustrated) present on the PC 260. Note that the connection between the information processing apparatus 100 and the PC 260 is not limited to a LAN and may be configured to be connected via another connection scheme such as a parallel cable, a serial cable, a USB cable, Bluetooth, or the like.

A Chipset 211 represents a plurality of integrated circuits related in series. An RTC 270 is a real-time clock and is a chip dedicated for timing.

An external power source 240 disconnects power supply in accordance with an instruction from a control program stored in the eMMC 219. Even when the external power source 240 is not connected, however, since there is power supply from a built-in battery (not illustrated), the operation can be ensured during a sleep state. Accordingly, in a state where the Chipset 211 is partially powered, recovery from the sleep state can be achieved. In contrast, in a shutdown state where the Chipset 211 is not powered at all, the RTC 270 is unable to operate.

An Embedded Controller 280 has a CPU 281 and a RAM 282. The CPU 281 executes a software program of the Embedded Controller 280 to perform partial control in the information processing apparatus 100. The RAM 282 is a random access memory and is used for storage of a program or temporary data when the CPU 281 controls the information processing apparatus 100.

An LED 290 is turned on when necessary and is used to externally transfer an anomaly of software or hardware.

Partition Configuration

Figure 2:
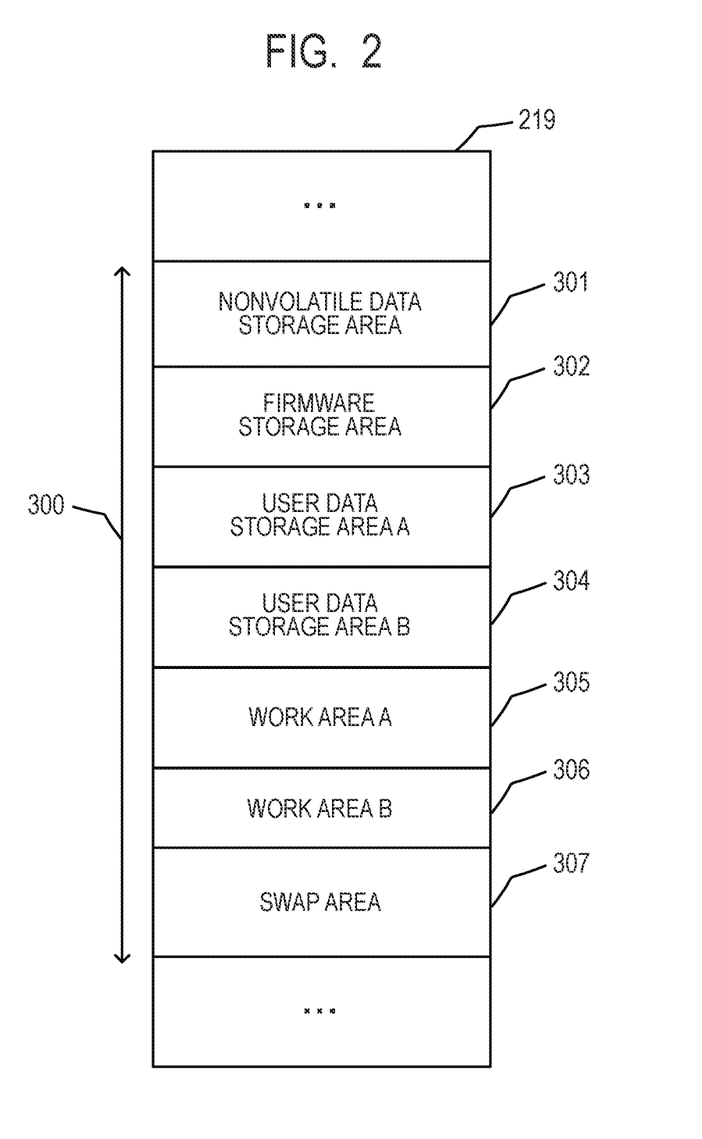
FIG. 2 is a diagram illustrating an example of a partition configuration of a system area inside a semiconductor storage device.

FIG. 2 is a diagram illustrating an example of a partition configuration of a system area 300 in the eMMC 219 of the semiconductor storage device of the information processing apparatus 100.

A nonvolatile data area 301 is an area to store setting values or the like of devices to be held in a nonvolatile manner. A firmware storage area 302 is an area to store firmware that implements the function of the information processing apparatus 100.

A user data storage area a 303 and a user data storage area b 304 store various user data. The work area a 305 and a work area b 306 are used as a work area for job execution or the like. A swap area 307 is an area for swap used during the operation of the information processing apparatus 100.

Firmware Configuration

Figure 3:
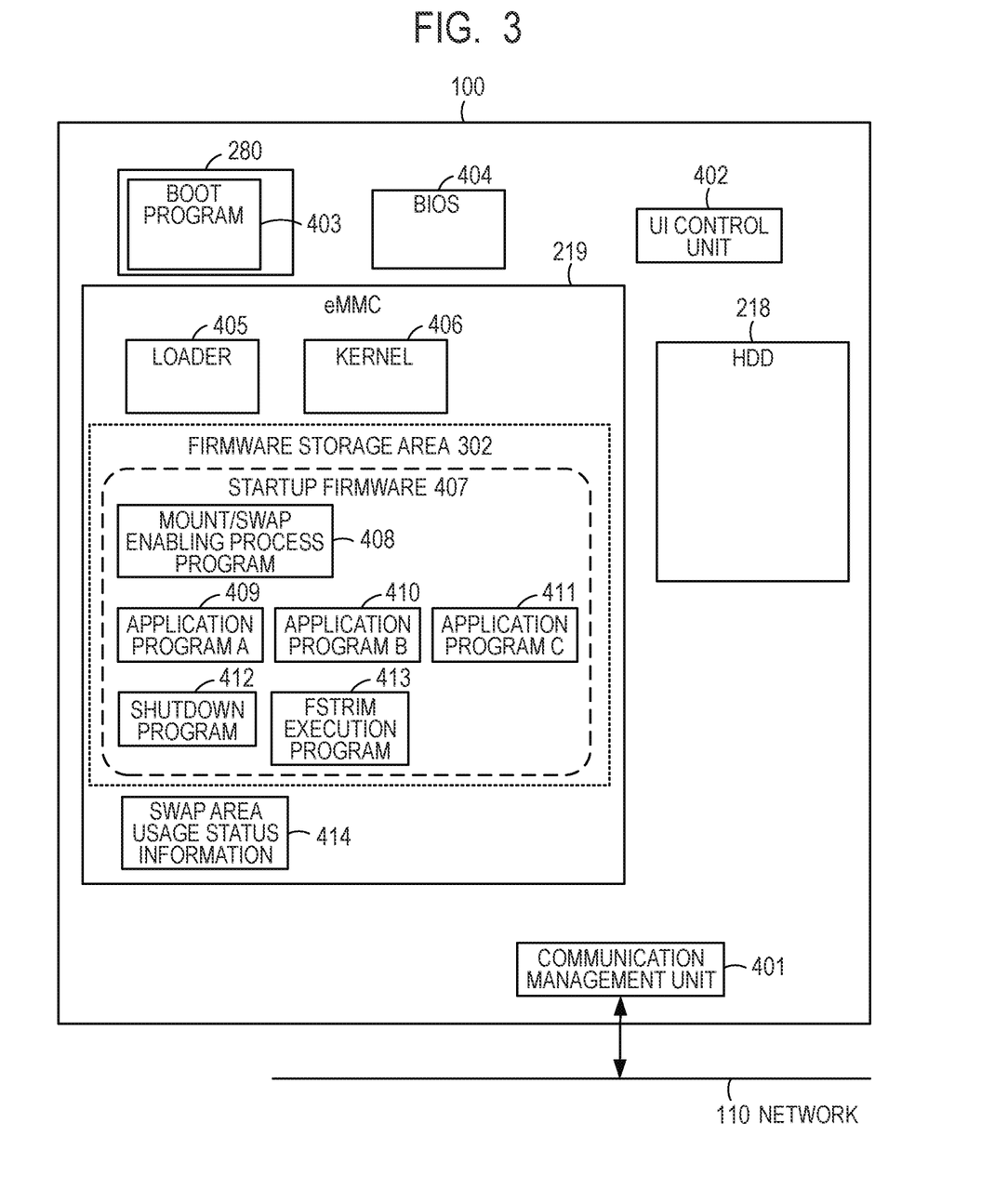
FIG. 3 is a diagram illustrating an example of a configuration of a firmware module of the information processing apparatus.

FIG. 3 is a diagram illustrating an example of a configuration of a firmware module of the information processing apparatus 100.

A communication management unit 401 controls the NIC 214 connected to a network 110 and externally transmits and receives data via the network 110.

A UI control unit 402 receives input to the operation unit 220 via the operation unit I/F 215 and performs a process or window output in accordance with the input.

A boot program 403 is a program executed by the CPU 281 of the Embedded Controller 280 in response to the information processing apparatus 100 being powered on and performs a process related to startup. The BIOS 404 is a program executed by the CPU 210 after execution of the boot program 403 and performs a process related to startup.

A loader 405 is a program executed by the CPU 210 after completion of the process of the BIOS 404 and performs a process related to startup such as loading of a kernel 406.

The kernel 406 is a program executed by the CPU 210 after completion of the process of the loader 405, which is a program corresponding to operating system (OS), and performs a process related to startup.

The firmware storage area 302 represents a partition configured in the eMMC 219 also described above in FIG. 2. The firmware storage area 302 stores startup firmware 407. The startup firmware 407 includes each program by which the information processing apparatus 100 operates and provides functions.

The startup firmware 407 is a program executed by the CPU 210 and is formed of a plurality of programs that provide respective functions in the information processing apparatus 100, which may be, for example, a program for controlling the scanner I/F 217 or the printer I/F 216, a startup program, or the like.

At startup, a mount/swap enabling process program 408 is called from the startup firmware 407. The mount/swap enabling process program 408 mounts each area of the eMMC 219 and the HDD 218 used during startup and performs a startup process to enable the swap area. A plurality of programs that provide respective functions in the information processing apparatus 100 listed in the examples described above are then sequentially started. In the present embodiment, these programs are denoted as an application program a 409, an application program b 410, and an application program c 411 for the purpose of illustration.

Once the information processing apparatus 100 receives a shutdown instruction, the shutdown program 412 starts a shutdown process and provides a termination notification to each of the application programs 409, 410, and 411. The shutdown program 412 requests the external power source 240 to power off in response to confirming the termination of respective applications, and finally, the power supply to the information processing apparatus 100 is cut off, and the shutdown operation is completed. Note that the shutdown instruction described above may be a shutdown instruction caused by turning off of a rocker switch (not illustrate), a shutdown instruction from a PC 260 or an external server 250 via a network, a shutdown instruction from the operation unit 220, or the like.

Further, the startup firmware 407 includes a fstrim execution program 413 that performs trim issuance that enables execution at a particular timing from an application. The fstrim execution program 413 is executed for a readable and writable area designated from the application and notifies the eMMC 219 of a storage area that is no longer necessary for the file system of the OS. A trim process (notifying the eMMC 219 of a storage area that is no longer necessary by using a trim command) eliminates the need for performing a wear levelling process on the unnecessary area and can suppress a reduction in the performance of the eMMC 219.

The shutdown program 412 acquires usage status information on the swap area 307 during a shutdown process and saves the acquired usage status information as swap area usage status information 414 in the eMMC 219 (that is, a nonvolatile storage area).

The HDD 218 can store various data that overflows from the eMMC 219.

Shutdown Process

Figure 4:
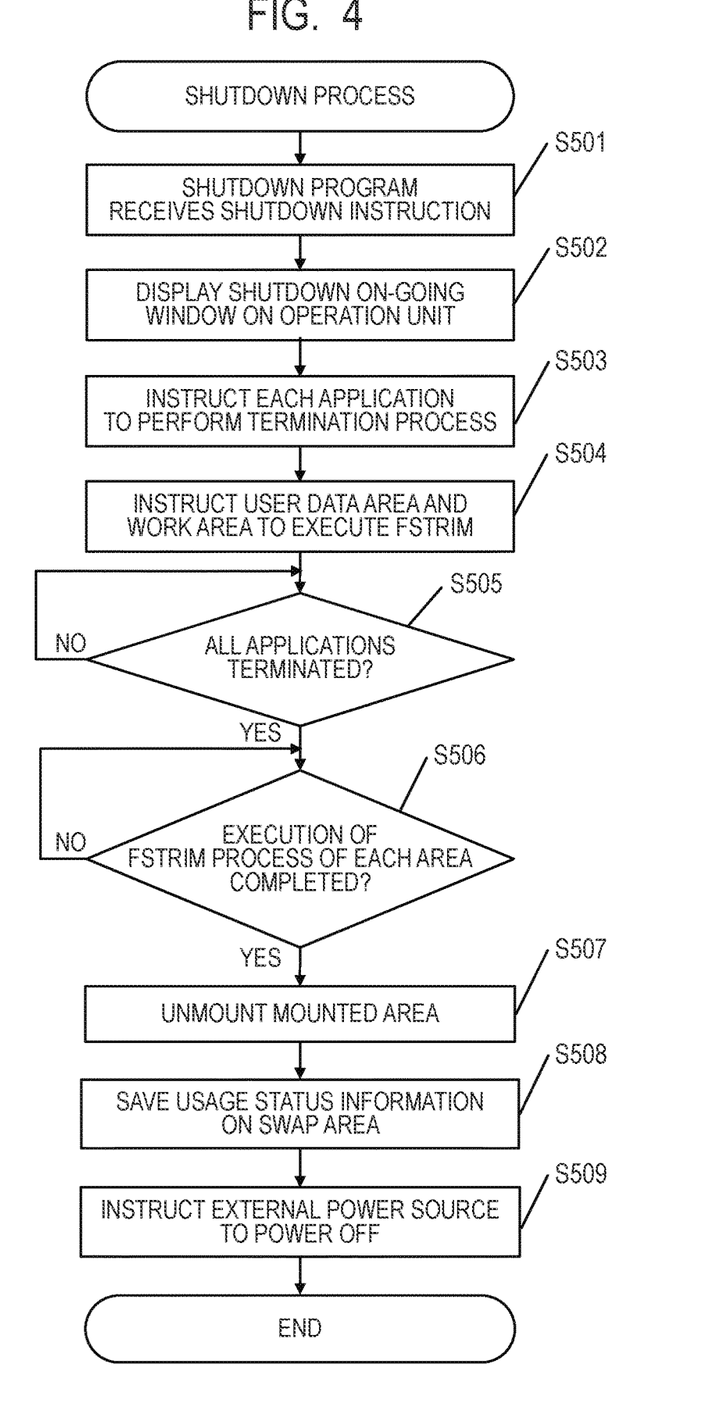
FIG. 4 is a flowchart illustrating a shutdown process in first and second embodiments.

FIG. 4 is flowchart illustrating the shutdown process of the present embodiment. The process of the flowchart illustrated in FIG. 4 is performed by the CPU 210 in accordance with the program stored in the eMMC 219 illustrated in FIG. 1. Note that, once starting the shutdown process, the information processing apparatus 100 enters a state not accepting any user operation and thus does not even accept a job such as a new print job, a new scan job, a new FAX job, or the like.

In a state where the startup firmware 407 of the firmware storage area 302 is already started, the CPU 210 receives a shutdown instruction in S501. For example, the CPU 210 receives a shutdown instruction caused by turning off of a rocker switch, a shutdown instruction from a PC 260 or an external server 250 via a network, a shutdown instruction from the operation unit 220, or the like. At this time, the CPU 210 provides a notification of the shutdown instruction to the shutdown program 412 included in the startup firmware 407 in the eMMC 219.

In response to receiving the above notification of the shutdown instruction, the shutdown program 412 displays a shutdown on-going window on the operation unit 220 in S502. Displaying the shutdown window leads to a state that prevents the user from operating the information processing apparatus 100 from the operation unit 220. In a state that blocks a user operation from the operation unit 220, the shutdown program 412 proceeds with the process to S503.

In S503, the shutdown program 412 instructs each of the application program a 409, the application program b 410, the application programs c 411, which is already started, to perform shutdown. Each of the application programs that have received the shutdown instruction performs a termination process such as cancellation of a job being executed, appropriate saving or release of a resource being used, or the like and, upon termination, notifies the shutdown program 412 of the termination.

While waiting for a notification of termination of all the applications, the shutdown program 412 instructs each user data area and each work area to execute fstrim by using the fstrim execution program 413 in S504.

Further, the shutdown program 412 proceeds to S506 if all the application programs are terminated in S505 and, if not, waits for termination of the applications in S505.

Upon confirmation of the termination of all the applications in S505, the shutdown program 412 in S506 checks whether or not the execution of the fstrim process instructed to perform in S504 described above is completed. Specifically, when starting fstrim execution, the shutdown program 412 sets a flag indicating that the fstrim is being executed. The flag is unset in response to completion of the process performed by the fstrim execution program 413, thereby the completion of the fstrim is confirmed, and it is determined whether or not to proceed with the shutdown process. As soon as the completion of the fstrim process execution is confirmed, the shutdown program 412 proceeds with the process to S507.

In S507, the shutdown program 412 unmounts the area that has been mounted at startup.

In S508, the shutdown program 412 then acquires the usage status of the swap area 307 (for example, the amount of unnecessary data or the like) and saves the acquired usage status in the eMMC 219 as the swap area usage status information 414. Specifically, the value acquired through execution of an area usage status acquisition command provided by the OS is saved as the swap area usage status information 414.

Subsequently, in S509, the shutdown program 412 requests the external power source 240 to power off, finally the power supply to the information processing apparatus 100 is cut off, and the shutdown operation is completed.

Trim Process by Mount/Swap Enabling Process Program During Startup

Figure 5:
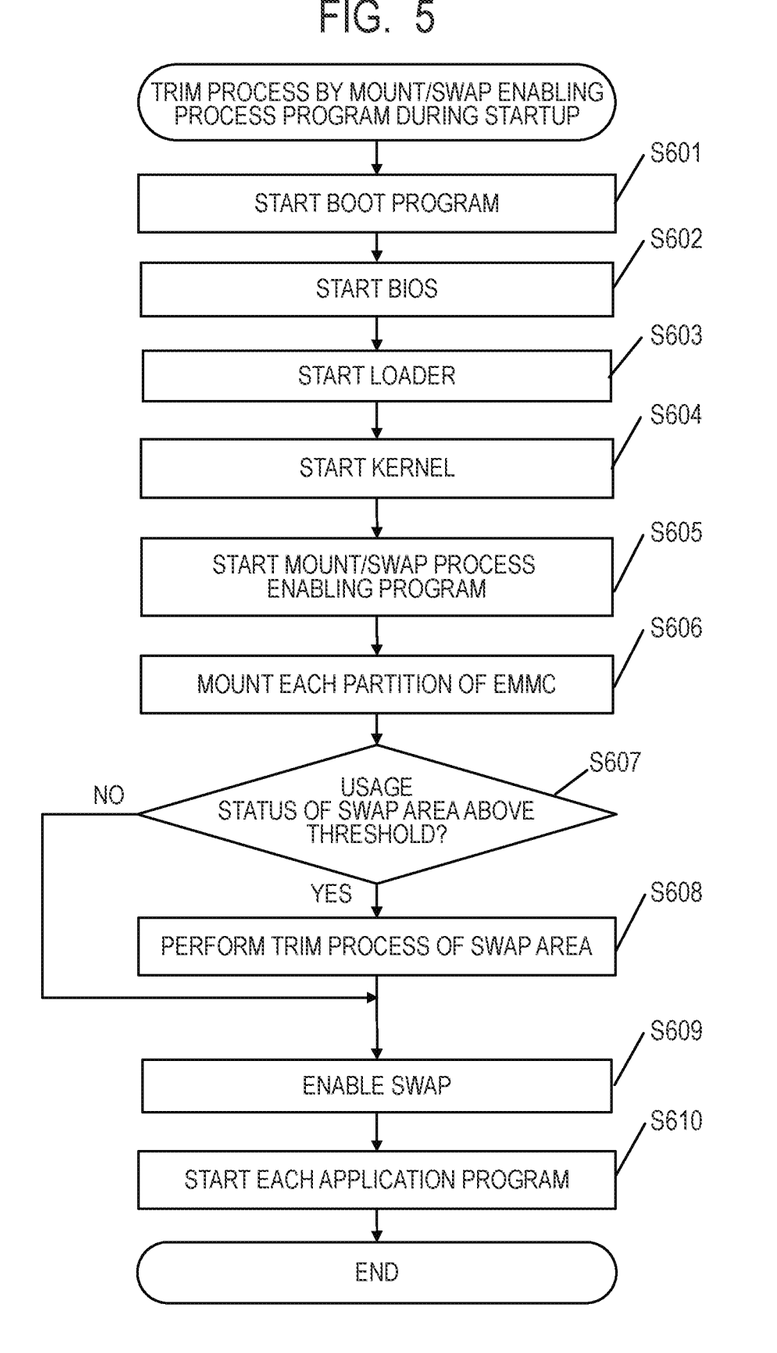
FIG. 5 is a flowchart illustrating a trim process of a swap area in the first embodiment.

FIG. 5 is a flowchart illustrating a trim process of a swap area performed by the mount/swap enabling process program 408 during startup in a first embodiment. The process of the flowchart illustrated in FIG. 5 is performed by the CPU 210 in accordance with the program stored in the eMMC 219 illustrated in FIG. 1. Note that commands provided by OS include a swap enabling command, and options of the swap enabling command include a discard option that is an option to trim a swap area when enabling swap. The mount/swap enabling process program 408 can perform a trim process of a swap area and a process to enable swap by executing a swap enabling command after setting this discard option.

In the startup process of the information processing apparatus 100, the boot program 403, the BIOS 404, the loader 405, the kernel 406, and the startup firmware 407 are sequentially started.

Once the information processing apparatus 100 is powered on, the boot program 403 is loaded into the RAM 212 from the ROM 291 and executed by the CPU 210.

The CPU 210 sequentially starts the boot program 403 in S601, the BIOS 404 in S602, the loader 405 in S603, and the kernel 406 in S604.

In response to completion of the startup of the kernel 406, the CPU 210 starts the mount/swap enabling process program 408 of the startup firmware 407 in S605.

When started, the mount/swap enabling process program 408 performs a mount process of each partition in the eMMC 219 in S606. Specifically, the mount/swap enabling process program 408 mounts the user data storage area a 303, the user data storage area b 304, the work area a 305, and a work area b 306 used by respective application programs started later.

Subsequently, in S607, the mount/swap enabling process program 408 references the swap area usage status information 414 to check whether or not the usage status of the swap area is greater than or equal to a set threshold T1. If the usage status is greater than or equal to the threshold (S607, Yes), the mount/swap enabling process program 408 performs a trim process of the swap area 307 in S608 and enables swap in S609. Herein, S608 and S609 will be described in detail. Commands provided by the OS include a swap enabling command, and options of the swap enabling command include a discard option that is an option to trim a swap area when enabling swap. The mount/swap enabling process program 408 executes the swap enabling command after setting this discard option, and thereby performs the trim process of the swap area in S608 and the process of enabling the swap in S609.

In contrast, if the value of the swap area usage status information 414 is less than the threshold (S607, No), the mount/swap enabling process program 408 enables the swap in S609. In such a case, the mount/swap enabling process program 408 executes the swap enabling command without setting the discard option and performs only the process of enabling the swap in S609 without performing the trim process of the swap area in S608.

Then, after completion of the process of the mount/swap enabling process program 408, the CPU 210 starts the application program a 409, the application program b 410, and the application program c 411 in S610.

As described above, when enabling a swap area, the mount/swap enabling process program 408 determines whether or not to perform a trim process of the swap area and performs control in accordance with the usage status of the swap area. This makes it possible to perform a trim process of a swap area only when highly needed. As a result, it is possible to suppress the startup time of the information processing apparatus from being longer and improve the user convenience while preventing deterioration in the performance of the eMMC 219 of the semiconductor storage device.

Second Embodiment

In the first embodiment described above, the configuration of performing a trim process by the mount/swap enabling process program 408 during startup has been described. In the second embodiment, a configuration of performing a trim process by the loader 405 during startup will be described.

Trim Process by Loader During Startup

Figure 6:
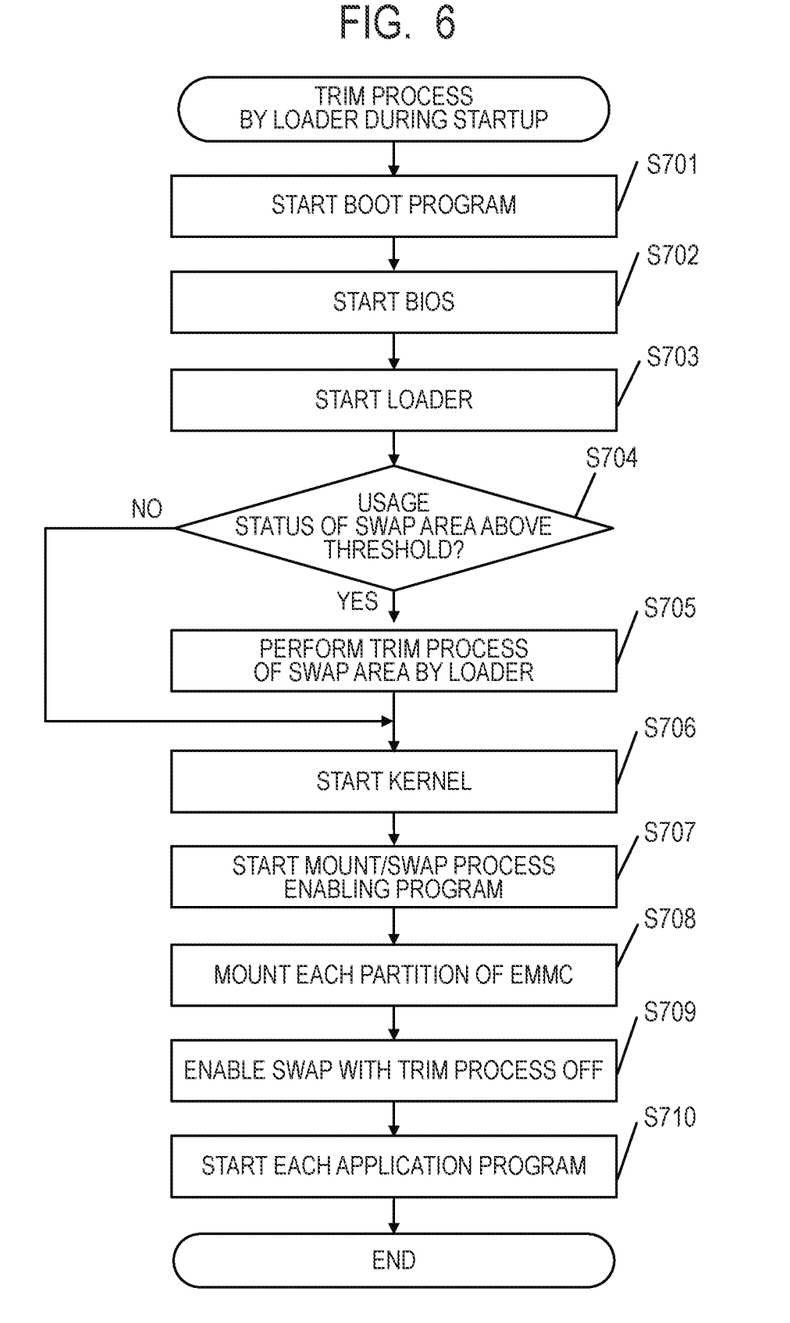
FIG. 6 is a flowchart illustrating a trim process of a swap area in the second embodiment.

FIG. 6 is a flowchart illustrating a trim process of a swap area performed by the loader 405 during startup in a second embodiment. The process of the flowchart illustrated in FIG. 6 is performed by the CPU 210 in accordance with the program stored in the eMMC 219 illustrated in FIG. 1.

Once the information processing apparatus 100 is powered on, the boot program 403 is loaded into the RAM 212 from the ROM 291 and executed by the CPU 210. The boot program 403 is started in S701, the BIOS 404 is started in S702, and the loader 405 is started in S703, sequentially.

In S704, the loader 405 references the swap area usage status information 414 to check whether or not the usage status of the swap area is greater than or equal to a set threshold T1. If the usage status is greater than or equal to the threshold (S704, Yes), the loader 405 performs a trim process of the swap area 307 in S705.

In contrast, if the usage status is less than the threshold (S704, No), the loader 405 does not perform a trim process of the swap area 307.

The trim process performed by the loader 405 will be described herein. The timing of the trim process performed by the loader 405 is a time before startup of the kernel 406, which still corresponds to the OS. Thus, the loader 405 performs the trim process by instructing the controller software in the eMMC 219 mounted to the eMMC 219 to perform a direct trim process on the swap area 307 without via the OS.

After completion of the process of the loader 405, the CPU 210 starts the kernel 406 in S706.

In response to completion of the startup of the kernel 406, the CPU 210 starts the mount/swap enabling process program 408 of the startup firmware 407 in S707.

In S708, the mount/swap enabling process program 408 performs a mount process of each partition in the eMMC 219 in the same manner as S606 of FIG. 6 described in the first embodiment.

Subsequently, in S709, the mount/swap enabling process program 408 executes a swap enabling command without setting the discard option described above and thereby enables the swap area 307 without performing a trim process. In the second embodiment, when a trim process on a swap area is required, the trim process is performed by the loader 405 before the kernel 406 is started. Thus, in the second embodiment, no trim process on the swap area 307 is performed by the mount/swap enabling process program 408.

Then, after completion of the process of the mount/swap enabling process program 408, the CPU 210 starts the application program a 409, the application program b 410, and the application program c 411 in S710. This process is the same as S606 of FIG. 6.

As described above, the loader 405 during startup determines whether or not to perform a trim process of the swap area and performs control in accordance with the usage status of the swap area. This makes it possible to perform a trim process of a swap area only when highly needed. As a result, it is possible to suppress the startup time of the information processing apparatus from being longer and improve the user convenience while preventing deterioration in the performance of the eMMC 219 of the semiconductor storage device.

Third Embodiment

Although the configuration of performing a trim process on the swap area during startup has been described in the above first and second embodiments, the trim process on the swap area during startup may be performed during shutdown. For example, during shutdown, the usage status of a work area of another application is checked together with the swap area. Then, if the usage status of the work area of another application is below a certain value, the trim process on the swap area is performed during a shutdown process, and a TRIM process at swap enabling during startup is skipped. This process will be described below with reference to FIG. 7.

Figure 7:
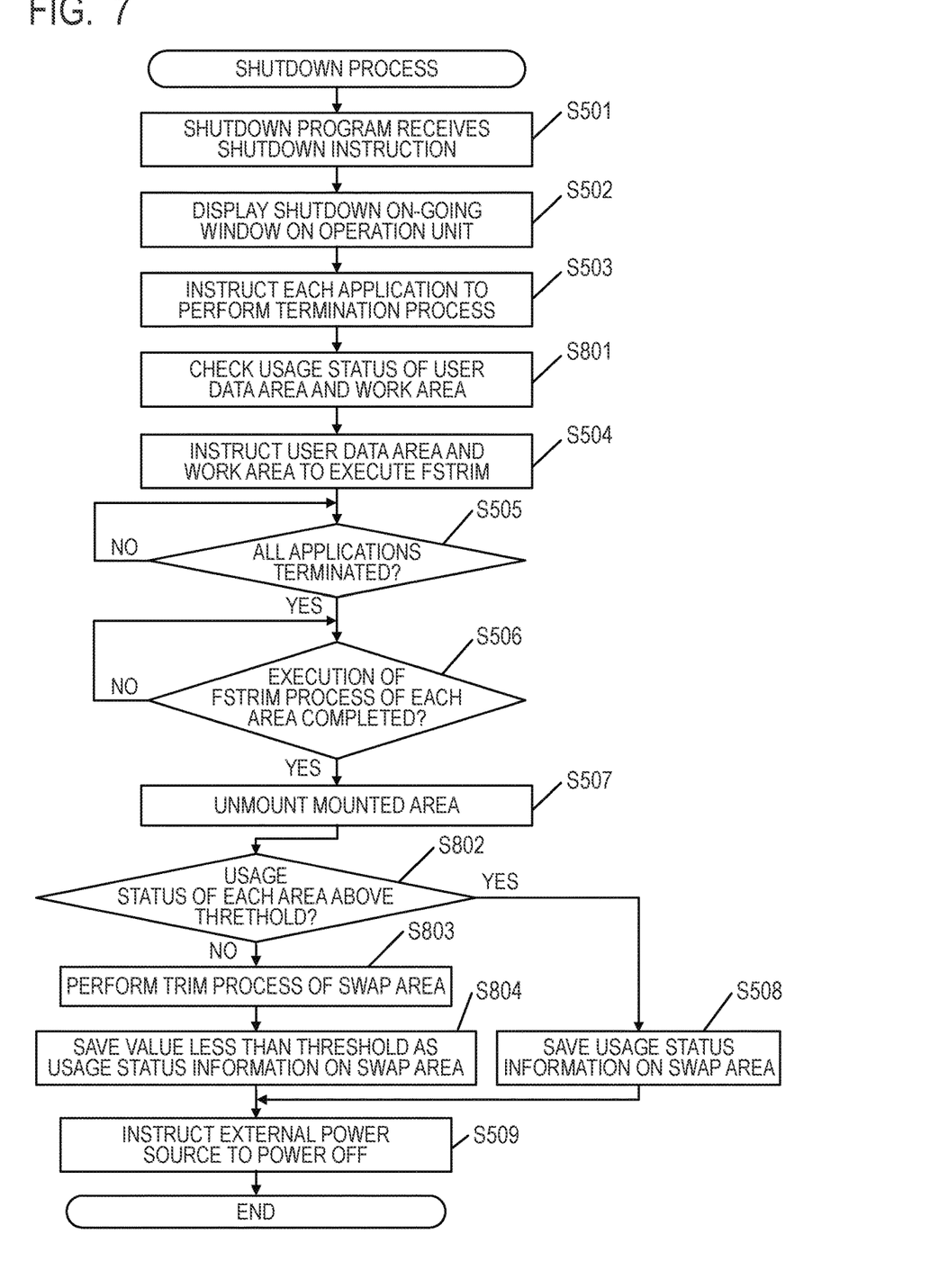
FIG. 7 is a flowchart illustrating a shutdown process in a third embodiment.

FIG. 7 is a flowchart illustrating a shutdown process in a third embodiment. The process of the flowchart illustrated in FIG. 7 is performed by the CPU 210 in accordance with the program stored in the eMMC 219 illustrated in FIG. 1. Note that, in FIG. 7, the same steps as those in FIG. 4 are provided with the same step number, and the description thereof will be omitted.

In the third embodiment, after the process of S503, the shutdown program 412 proceeds with the process to S801. In S801, the shutdown program 412 checks the usage status of each user data area and each work area and proceeds with the process to S504.

Further, after the process of S507, the shutdown program 412 proceeds with the process to S802. In S802, the shutdown program 412 checks whether or not the usage status of each area checked in S801 described above is greater than or equal to a predetermined threshold T2. If the usage status is less than the threshold (S802, No), the shutdown program 412 performs a trim process of the swap area 307 in S803. For example, the shutdown program 412 disables the swap and then enables the swap again to perform the trim process on the swap area. Furthermore, in S804, the shutdown program 412 saves a value less than the threshold (the threshold T1 illustrated in S607 of FIGS. 5 and S704 of FIG. 6) as the swap area usage status information 414 and proceeds with the process to S509.

In contrast, if the usage status of each area is greater than or equal to the predetermined threshold (S802, Yes), the shutdown program 412 proceeds with the process to S508.

As described above, in the present embodiment, by checking the usage status of the work area of another application in addition to a swap area, it is controlled whether a trim process of the swap area is to be performed during shutdown or during startup. The trim process of a work area of another application will be longer because of increased unnecessary data when the usage amount of the work area of another application is larger but will be shorter when the usage amount is smaller. Thus, when the usage amount of the work area of another application is smaller, the shutdown process time is instead used for the trim process time of the swap area, and the trim process during startup can be skipped to shorten the startup time. As a result, it is possible to suppress the startup time of the information processing apparatus from being longer and improve the user convenience while preventing deterioration in the performance of the eMMC 219 of the semiconductor storage device.

In the conventional configuration that performs trim of a swap area every time the information processing apparatus is started, this has an adverse effect such as a longer startup time before the application completes startup and the information processing apparatus is ready to be used, which may reduce user convenience. In contrast, in each embodiment described above, it is controlled whether or not to perform a trim process of a swap area in accordance with the usage status of the swap area or the like. Accordingly, it is possible shorten the startup time in accordance with the usage status of a swap area and improve user convenience while suppressing a reduction in the performance of the semiconductor storage device.

Note that the configuration of various data described above and the content thereof are not limited to the above and, obviously, may be configured in various configurations or contents in accordance with the application or purpose.

As set forth, although some embodiments have been illustrated, it is to be understood that embodiments of the present disclosure can be implemented in different forms, including as a system, an apparatus/device, a method, a program, a storage medium, or the like, for example. Among other things the present disclosure may be applied to a system formed of a plurality of devices or may be applied to an apparatus formed of a single device.

Further, all the configurations combining any of the embodiments described above are also included within the scope of the present disclosure.

According to various embodiments of the present disclosure, it is possible shorten the startup time in accordance with the usage status of a swap area and improve user convenience while suppressing deterioration in the performance of a semiconductor storage device.

OTHER EMBODIMENTS

Various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Further, the present disclosure may be applied to a system formed of a plurality of devices or may be applied to an apparatus formed of a single device.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2022-033143, filed on Mar. 4, 2022, which is hereby incorporated by reference herein in its entirety.

What is claimed is:

1. An information processing apparatus including a semiconductor storage device, at least one memory that stores a program, and at least one processor that executes the program to execute:
    enabling a swap area provided in the semiconductor storage device during startup of the information processing apparatus;
    performing a first trim process that notifies the semiconductor storage device of a storage area that no longer requires the swap area;
    checking usage status of the swap area and saving the usage status in a nonvolatile storage area during shutdown of the information processing apparatus;
    controlling whether or not to perform the first trim process based on the usage status of the swap area saved in the nonvolatile storage area during startup of the information processing apparatus;
    performing a second trim process that notifies the semiconductor storage device of a storage area that no longer requires a work area of an application program provided in the semiconductor storage device during the shutdown; and
    checking usage status of the work area of the application program provided in the semiconductor storage device during the shutdown and controlling whether or not to perform the first trim process based on the usage status of the work area.

2. The information processing apparatus according to claim 1, wherein the first trim process is executed for the enabling, and the first trim process is executable when enabling the swap area.

3. The information processing apparatus according to claim 1, wherein the first trim process is executed for a loader configured to load operating system.

4. The information processing apparatus according to claim 1,
    wherein the controlling whether or not to perform the first trim process performs control to perform a trim process of the swap area when the usage status of the swap area saved in the nonvolatile storage area during startup of the information processing apparatus exceeds a threshold, and
    wherein the checking usage status of the work area of the application program saves a value smaller than the threshold in the nonvolatile storage area when performing a trim process of the swap area.

5. The information processing apparatus according to claim 1, wherein the information processing apparatus is an image processing apparatus.

6. A method of controlling an information processing apparatus including a semiconductor storage device, at least one memory that stores a program, and at least one processor that executes the program to execute the method, the method comprising:
    checking usage status of the swap area provided in the semiconductor storage device and saving the usage status in a nonvolatile storage area during shutdown of the information processing apparatus;
    controlling, based on the usage status of the swap area saved in the nonvolatile storage area, whether or not to perform a first trim process to notify the semiconductor storage device of a storage area that no longer requires the swap area during startup of the information processing apparatus;
    performing a second trim process that notifies the semiconductor storage device of a storage area that no longer requires a work area of an application program provided in the semiconductor storage device during the shutdown; and
    checking usage status of the work area of the application program provided in the semiconductor storage device during the shutdown and controlling whether or not to perform the first trim process based on the usage status of the work area.

* * * * *